United States Patent Office 2,824,858
Patented Feb. 25, 1958

2,824,858
POLYMERIZABLE POLY-ETHYLENICALLY UNSATURATED COMPOUNDS, POLYMERS THEREOF, AND THEIR PREPARATION

Sidney Melamed, Philadelphia, Pa., assignor to Rohm & Haas Company, Philadelphia, Pa., a corporation of Delaware No Drawing. Application September 27, 1954
Serial No. 458,691

15 Claims. (Cl. 260—77.5)

This invention relates to novel and improved polyethylenically unsaturated ureidoalkyl vinyl ethers, polymers thereof and processes of making the ethers and their polymers.

The ethers of the present invention comprise polyethylenically unsaturated polymerizable compounds falling within the following general formula $$(CH_2=CHOANRCONR')_nB \qquad I$$

wherein A is a cyclohexylene group or an alkylene group of 2 to 18 carbon atoms, of which a chain of at least two is connected between the adjoining nitrogen and oxygen atoms, R is selected from hydrogen and a monovalent hydrocarbon group of 1 to 18 carbon atoms or any of such groups substituted by hydroxyl, halogen, nitro, or cyano groups, or by an amino group whose nitrogen is tertiary, R' is selected from H and aliphatic or cycloaliphatic hydrocarbon groups of 1 to 24 carbon atoms or any of such groups substituted by hydroxyl, halogen, nitro, or cyano groups, or by an amino group whose nitrogen is tertiary, $n$ is an integer having a value of 2 to 3, and B is a divalent or trivalent aliphatic or alicyclic hydrocarbon, preferably alkylene or cycloalkylene, group of 2 to 18 carbon atoms, a di- or trivalent residue of benzene, of naphthalene, of diphenyl, of a diphenylalkane, or of a triphenylalkane.

It has been found that numerous of the compounds of the invention within the scope of Formula I are of exceptional stability so that they can be isolated without loss of unsaturation by cyclization.

One such group of stable compounds are those having the structure of the following formula $$(CH_2=CHOANRCONH)_nB \qquad II$$

where A, R, and B are the same as defined hereinabove. Preferred compounds are those in which R is an alkyl or cycloalkyl group and B is an alkylene group.

Another group includes those having the formula $$(CH_2=CHOANR^2CONR')_nB \qquad III$$

in which A, B, and R' have the same definition as above, and R² is a monovalent hydrocarbon group of 1 to 18 carbon atoms or any of such groups substituted by hydroxyl, halogen, nitro, or cyano groups, or by an amino group whose nitrogen is tertiary. Preferred compounds of this group are those in which R² is an alkyl or cycloalkyl group, and R' is saturated.

A third group has the formula $$(CH_2=CHOYC(R^3)(R^4)NHCONR')_nB \qquad IV$$

in which R' and B are defined hereinabove, and Y is an alkylene group of 1 to 7 carbon atoms, R³ is an alkyl group of 1 to 4 carbon atoms, and R⁴ is an alkyl group of 1 to 4 carbon atoms.

A fourth group comprises compounds of the general formula $$(CH_2=CHOZNHCONR')_nB \qquad V$$

where R' and B are as defined above and Z is a cyclohexylene group or an alkylene group of 4 to 18 carbon atoms of which a chain of at least 4 is connected between the adjoining nitrogen and oxygen atoms.

The compounds of Formula II are made by the reaction of one mole of a polyisocyanate of the structure $B(NCO)_n$ wherein $n$ is 2 or 3 with two or three moles of an aminoalkyl vinyl ether of the formula $$CH_2=CHOANHR \qquad VI$$

R and A being as defined above. The reaction is effected at a temperature of −15° C. to 100° C., preferably −10° C. to 35° C. Inert solvents, e. g. benzene or petroleum ether, may be used but are not necessary in all cases. Typical polyisocyanates $B(NCO)_n$ which may be employed are the following:

Hexamethylenediisocyanate
Decamethylenediisocyanate
2-undecyl-1,3-diisocyanatopropane
p-Phenylenediisocyanate
Toluene-2-4-diisocyanate
2-4-diisocyanato-1-chloro-benzene
4,4'-diisocyanato-diphenyl
2,6-diisocyanato-naphthalene
4,4'-diisocyanato-diphenylmethane
4,4',4''-triisocyanato-triphenylmethane
1,4-cyclohexylene-diisocyanate
p-Isocyanatobenzyl isocyanate
2,3-dimethyltetramethylene diisocyanate
1,2,4-benzene triisocyanate
Hexane-1,2,6-triisocyanate
1,8-diisocyanato-paramenthane of the formula

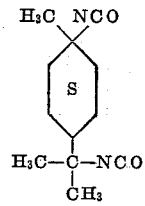

*Note.*—The symbol S indicates a saturated ring.

The amines (Formula VI) used in the preparation of the compounds of Formula II are those derived from the vinylation of hydroxyalkylamines with acetylene under such conditions as described by Reppe. Examples of such amines which may be employed are listed below:

$CH_2=CHOCH_2CH_2NH_2$
$CH_2=CHOCH_2CH_2NHCH_3$
$CH_2=CHOCH_2CH_2CH_2NH_2$
$CH_2=CHOCH_2CH(CH_3)NH_2$
$CH_2=CHOCH(CH_3)CH_2NH_2$
$CH_2=CHOCH_2C(CH_3)_2NH_2$
$CH_2=CHOC(CH_3)_2CH_2NH_2$
$CH_2=CHOCH_2CH_2CH_2CH_2NH_2$
$CH_2=CHOC(CH_3)_2CH_2CH(CH_3)NH_2$
$CH_2=CHOCH_2CH_2CH(CH_3)(CH_2)_3C(CH_3)_2NH_2$
$CH_2=CHOCH_2C(CH_3)_2CH_2NH_2$
$CH_2=CHOCH_2CH(CH_3)NHCH_3$

The vinyl aminoalkyl ether may have an N-substituent (R) other than hydrogen and the preferred methyl group, such as ethyl, butyl, phenyl, methylphenyl, butylphenyl, benzyl, methylbenzyl, cyclohexyl, and so on, typical compounds then being $CH_2=CHOCH_2CH_2NHC_6H_5$ (distilling at 128°–130° C./9 mm.),
$CH_2=CHOCH_2CH_2NHC_4H_9$ (distilling at 88°–99° C./120 mm.),
$CH_2=CHOCH(CH_3)CH_2NHC_2H_5$ (distilling at 72°–73° C./120 mm.),
$CH_2=CHOCH_2CH_2NHCH_2C_6H_5$, $CH_2=CHOCH_2CH(CH_3)NHC_6H_4CH_3$,
$CH_2=CHOCH_2CH_2NHC_6H_{11}$,
$CH_2=CHOCH_2CH_2NHCH_2CH=CH_2$,
$CH_2=CHOCH_2CH_2NHCH_2CH=CHCH_3$,
$CH_2=CHOCH_2CH_2NH(CH_2)_9CH=CH_2$,
$CH_2=CHOCH_2CH_2NHC_{18}H_{33}$ (2 double bonds soya amine),
$CH_2=CHOCH_2CH_2NHC_{18}H_{35}$ (oleyl amine),

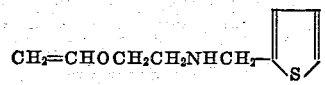

(from butadiene monoxide),

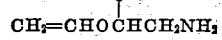

(from vinylcyclohexene monoxide),
$CH_2=CHOCH_2CH_2NHCH_2CH_2C\equiv CCH_3$, etc.

The last compound is available, for example, through the reaction of methylacetylene and ethylene oxide to yield $CH_3C\equiv CCH_2CH_2OH$, which is converted to the chloride with thionyl chloride, the chloride being then reacted with ethanolamine to form the alcohol $$RNHCH_2CH_2OH$$

where R is an alkynyl group. This alcohol reacts with acetylene to form the desired vinyl ether. In forming alkynyl derivatives it is preferred that the multiple linkage occur between intermediate carbons rather than at a terminal carbon.

The alkylene group may be substituted with other than aliphatic groups and may be interrupted with heteroatoms. Also the chain of A may be part of a cycle. Examples of compounds of these sorts are $CH_2=CHOC_6H_{10}NH_2$
$CH_2=CHOCH_2CH_2C_6H_{10}C(CH_3)_2NH_2$ ($C_6H_{10}$ being the cyclohexyl nucleus in both cases).

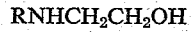

$CH_2=CHOCH(C_6H_5)CH_2NH_2$
$CH_2=CHOCH_2CH_2C(CH_3)(C_6H_5)NH_2$
$CH_2=CHOCH_2CH_2OCH_2CH_2NH_2$
$CH_2=CHOCH_2CH_2OCH_2CH(CH_3)NH_2$
$CH_2=CHOCH_2CH_2OCH_2CH_2NHCH_3$
$CH_2=CHOCH_2CH_2OCH_2CH_2NHC_6H_5$
$CH_2=CHOCH_2CH_2OCH_2CH_2NHCH_2C_6H_5$
$CH_2=CHOCH_2CH_2SCH_2CH_2NH_2$
$CH_2=CHOCH_2CH_2OCH_2CH_2NHC_2H_5$
$CH_2=CHOCH_2CH_2OCH_2CH_2OCH_2CH_2NH_2$

The preparation of compounds of Formula III, IV and V involves the reaction of a bis-carbamyl chloride of the formula $$B(NR'COCl)_n \qquad \text{VII}$$

and an amine of one of the following formulas:

$$CH_2=CHOANHR^2 \qquad \text{VIII}$$
$$CH_2=CHOYC(CH_3)_2NH_2 \qquad \text{IX}$$
$$CH_2=CHOZNH_2 \qquad \text{X}$$

respectively in which the symbols have the same definitions as above. The conditions of the reaction may vary widely. The temperature may be from —10° C. to 100° C., preferably —10 to 50° C. Reaction is preferably effected in all cases in the presence of a basic acceptor for the hydrogen chloride liberated, such as excess of the amine reactant, or an inorganic base, such as NaOH, KOH, $Na_2CO_3$, $K_2CO_3$, etc. The reaction may be effected in an inert solvent such as benzene, toluene, xylene, petroleum ether or in a mixture of such a solvent with water.

Examples of the bis-carbamyl chlorides of Formula VII that may be used are:

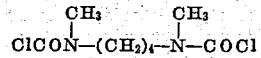

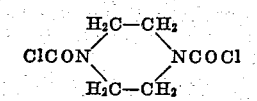

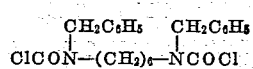

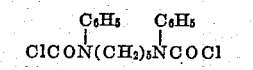

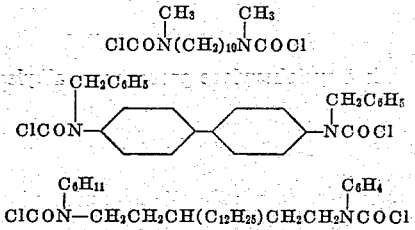

(in which $C_6H_{11}$ is the cyclohexyl group).

Representative amines of Formula VIII include all those listed above as representative of those of Formula VI in which substituent R is other than hydrogen.

Representative amines of Formula IX include $H_2NC(CH_3)_2CH_2OCH=CH_2$
$H_2NC(CH_3)_2(CH_2)_3CH(CH_3)CH_2CH_2OCH=CH_2$
$H_2NC(C_2H_5)_2CH_2OCH=CH_2$
$H_2NC(C_3H_7)_2CH_2OCH=CH_2$
$H_2NC(C_4H_9)_2CH_2OCH=CH_2$ as well as others listed under Formula VI.

Representative amines of Formula X include Aminocyclohexyl vinyl ether

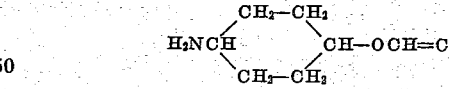

$H_2N(CH_2)_4OCH=CH_2$
$H_2NCH(CH_3)(CH_2)_2C(CH_3)_2OCH=CH_2$
$H_2NC(CH_3)_2(CH_2)_3CH(CH_3)(CH_2)_2OCH=CH_2$
$H_2NC(CH_3)_2C_6H_{10}(CH_2)_2OCH=CH_2$ $C_6H_{10}$ being the cyclohexyl nucleus, as well as others listed under Formula VI.

A third method by which certain of the compounds of Formula II and the compounds of Formula IV may be produced involves the reaction of vinyloxyalkylisocyanates of the structure $$CH_2=CHO-Y-C(CH_3)_2NCO \qquad \text{XI}$$

and di- and triamines corresponding to the following formula $$B(NHR')_n \qquad \text{XII}$$

The ethers of Formula XI are disclosed and claimed in copending application Serial No. 348,107, filed April 10, 1953, now U. S. Patent 2,727,020, in the hands of a common assignee. Examples thereof include 2-isocyanatoisobutyl vinyl ether and $$CH_2=CHOCH(CH_3)CH_2C(CH_3)_2NCO$$

Examples of the amines corresponding to Formula XII include ethylene diamine, trimethylene diamine, propylene diamine, hexamethylene diamine, decamethylene diamine, phenylene diamine, p,p'-biphenylene diamine, methylene bis-phenylamine, piperazine, triamines such as 1,2,6-triaminohexane, substituted amines such as N,N'-dibenzylphenylene diamine, and N,N'-dibutylpentamethylene diamine.

The compounds of this invention are generally solids of well-defined melting point. They are generally of moderate solubility in organic solvents but the solubility can be widely varied by the number and kind of substituent. The compounds of this invention are useful as bacteriostatic agents, as insecticides and as plant growth regulators. Certain of the compounds show activity as hypnotics and anticonvulsants. These new monomeric compounds are useful also as additives to aminoplast systems where they contribute increased stability to alkaline condensates and accelerate the cure under acid conditions. They impart to the resultant castings, laminates, moldings or films increased resistance to solvents and greatly reduced water-sensitivity.

Those of the new compounds in which the nitrogen atoms have a reactive hydrogen are useful as chemical intermediates to react with other compounds including aldehydes, such as formaldehyde, alkylene oxides, such as ethylene oxide, to form insecticides, fungicides, pharmaceuticals, textile assistants, resins, etc.

Suitably substituted compounds of this invention are compatible with resins such as polyvinyl chloride where they impart a stabilizing action as well as a degree of plasticization. Other compounds are soluble in lube-oils and lower the pour point and impart corrosion resistance.

The polymerization of the new compounds is effected in the presence of an acyclic azo compound. In such compound the —N=N— group is attached to aliphatic carbon atoms, at least one of which is tertiary. Typical azo catalysts are azodiisobutyronitrile, azodiisobutyramide, dimethyl (or diethyl or dibutyl) azodiisobutyrate, azobis($\alpha,\gamma$-dimethylvaleronitrile), azobis($\alpha$-methylbutyronitrile), azobis($\alpha$-methylvaleronitrile), dimethyl azobis-methylvalerate, and the like. In these catalysts one of the carbons bonded to the tertiary carbon atom has its remaining valences satisfied by at least one element from the class consisting of oxygen and nitrogen.

To effect polymerization the ureidoalkyl vinyl ether and the acyclic azo catalyst are mixed directly or in the presence of an inert solvent and the mixture is maintained between 60° and 100° C. until the desired extent of polymerization is attained. For water-soluble ureidoalkyl vinyl ethers water may serve as solvent, if desired. Other solvents include methanol, ethanol, isopropanol, butanol, dimethylformamide, benzene, toluene, ethyl acetate, etc. The amount of catalyst may be varied from about 0.1% to about 5% of the weight of the ureidoalkyl vinyl ether. The polymerization is best carried out in an inert atmosphere such as nitrogen gas.

For polymerization in solution concentrations of monomer from about 10% to about 60% are generally desirable. The course of polymerization may be readily followed from the increase in viscosity of the solution. The catalyst may be added in increments, if desired, with or without additional solvent.

The polyfunctional nature of the compounds of this invention generally directs their use in polymerization reactions to the preparation of thermoset, insoluble products useful as exchange resins, castings, laminates and the like. However in certain cases they may be judicially employed in small amounts in combination with other monovinyl compounds to increase the molecular weight of the final copolymer, improve performance and still retain solubility. Such examples are important in the preparation of resins for wet-strength paper, as flocculating agents, as warp sizes and the like. This is a very important application that enables resins to be produced that perform two to ten times as efficiently as those not containing the compounds of this invention.

Thus one class of compounds of interest are those soluble copolymers containing small amounts (less than 10% and usually 1–2%) of the compounds of this invention. Suitable comonomers for making this class of copolymers are amides such as acrylamide or methacrylamide, N-vinyl compounds such as vinylpyrrolidone, N-vinylcaprolactam, N-vinyl-N-methylacetamide, vinyl ethers such as hydroxyethyl vinyl ether, ethyl N-vinyloxyethylcarbamate and N-vinyloxyethyl-N,N'-ethyleneurea.

Another important class of compounds are insoluble, thermoset copolymers prepared from polymerizable vinyl compounds and the monomers of this invention. This includes a wide range of compositions and compounds. Representative vinyl compounds that may be used are esters of acrylic or methacrylic acid such as the methyl, ethyl, butyl, cyclohexyl or dodecyl esters, esters of other $\alpha,\beta$-unsaturated acids such as fumaric, maleic, itaconic, vinyl esters such as vinyl acetate, vinyl chloroacetate, vinyl stearate, nitriles such as acrylonitrile, methacrylonitrile, $\alpha$-alkylacrylonitriles, the $\alpha,\beta$-unsaturated acids mentioned above, amides of these acids such as acrylamide, methacrylamide, substituted amides such as N-methylacrylamide, N,N-dipropylmethacrylamide, N-vinyl compounds such as N-vinylpyrrolidone, vinylethyleneurea, N-vinylcarbazole, N-vinyl-N-methylacetamide, N-vinylbenzenesulfonamide, vinyl ethers such as butyl vinyl ether, hydroxyethyl vinyl ether, dimethylaminoethyl vinyl ether, vinyl sulfides such as t-butyl vinyl sulfide, hydroxyethyl vinyl sulfide, vinyl chloride, vinylidene chloride, 2- or 4-vinylpyridine, styrene, vinyltoluene, etc.

Another group of vinyl compounds that may be used are unsaturated polyesters such as those containing units of maleic, fumaric or itaconic acid.

For example, in the preparation of ion-exchange resins, 1–10% of the bis-vinyl ethers of the present invention and 99–90% of other monomer such as methyl acrylate or 4-vinylpyridine may be used and copolymerization effected in suspension, emulsion or solution. For the preparation of formed pieces, a mixture of 95–80% methyl methacrylate with 5–20% respectively of a bisvinyl ether and the polymerization catalyst are subjected to 80–100° C. under pressures of 100–1000 pounds per square inch pressure. The resultant pieces are hard and insoluble.

A third class of polymers are the homopolymers of the bis-vinyl ethers. These may be polymerized preferably in bulk to give hard, insoluble, infusible resins.

The polymers and copolymers may be used in conjunction with fillers or fibers to obtain a variety of properties such as lower density, higher impact strength, lower cost. The polymerizations may also be conducted in the presence of inert gases such as nitrogen or carbon dioxide to give foamed resins of low density.

*Example 1*

A solution of 35.4 g. (0.154 mole) of 1,8-diisocyanato-paramenthane in 100 ml. of dry benzene is cooled and stirred and treated slowly with 26.8 g. (0.308 mole) of 2-aminoethyl vinyl ether in 50 ml. of benzene over a period of one hour. The mixture becomes thick and the solid that forms is collected by filtration. Recrystallization from methanol gives 17 g. of white crystals (M. P. 145–6° C.) containing 13.8% nitrogen, 18.9% vinyl ether (theory 21.7% vinyl ether) and an ebulliometric molecular weight of 408±3. Theory demands 14.1% N and a molecular weight of 396. The structure of the product is as follows:

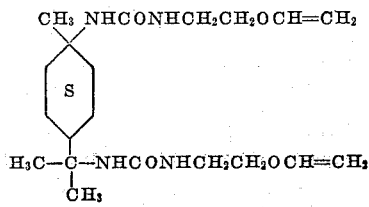

where S indicates that the ring is saturated. The product is soluble in hot acetone, hot butyl Cellosolve and hot petroleum ether (HAN solvent).

*Example 2*

(a) A solution of 17.4 g. (0.2 mole) of 2-aminoethyl vinyl ether in 150 ml. of dry benzene is treated slowly while stirring and cooling with 16.8 g. (0.1 mole) of 1,6-hexamethylene diisocyanate dissolved in 50 ml. of benzene. The product, which precipitates immediately, is recrystallized from 1 l. of boiling anhydrous ethanol to give on cooling and filtering 30 g. of a white, crystalline product, M. P. 171° C. This material is poorly soluble in water and common organic solvents but soluble in hot alcohol and dimethyl formamide. The product contained 16.4% nitrogen and 18.1% vinyl ether. The theoretical values for 1,6-bis-(2-vinyloxyethylureido)hexane $(CH_2=CHOCH_2CH_2NHCONHCH_2CH_2—)_2$ are 16.4% nitrogen and 25.5% vinyl ether.

(b) To 100 parts by weight of the product of part (a) hereof dissolved in 100 parts by weight of dimethyl formamide, 2 parts by weight of dimethyl azoisobutyrate are added with agitation. The mixture is heated at 60° C. under nitrogen. The polymer precipitates out as it forms.

(c) By the procedure of part (a) hereof, the following condensations are effected.

(1) $OCN(CH_2)_8NCO$ and $CH_2=CHOCH_2CH_2NHCH_3$ (2) $OCN(CH_2)_{10}NCO$ and $CH_2=CHO(CH_2)_5NH_2$ (3) 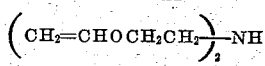 and $CH_2=CHOCH(C_{16}H_{33})CH_2NH_2$ (4) 2,4-diisocyanato-1-chlorobenzene and

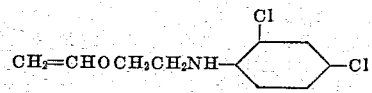

(5) 2,6-diisocyanato-naphthalene and $$CH_2=CHOCH_2CH_2NH-\underset{Cl}{\underset{|}{C_6H_3}}-Cl$$

(6) $CH(C_6H_4NCO)_3$ and $CH_2=CHOCH_2CH_2NHCH_3$

The crystalline products obtained are all insoluble in water but are soluble in dimethyl formamide.

*Example 3*

(a) A solution of one mole of the bis-carbamyl chloride derived from piperazine dissolved in 100 ml. of toluene is added dropwise with stirring at 35°–40° C. to a mixture of 2 moles of 2-N-methylaminoethyl vinyl ether, 200 ml. of toluene, 2.0 moles of potassium carbonate and 150 ml. of water. The addition requires 1 hour and the mixture is maintained at 40° C. for an additional 2 hours and then heated to reflux for one hour. The mixture is filtered; the upper layer is separated, washed with water, dried and concentrated to give the product as a white, crystalline solid readily soluble in organic solvents, such as ethanol, dimethyl formamide.

The product obtained is a representative of those of Formula III and because of its solubility in organic solvents, it can readily be copolymerized with vinyl acetate, acrylonitrile, aminoethylvinyl ether, and esters of acrylic or methacrylic acid, such as methyl or ethyl acrylate.

(b) A mixture of 98 parts of N-vinyloxyethyl-N,N'-ethyleneurea, 2 parts of the product of part (a), 2 parts of dimethyl azoisobutyrate and 100 parts of dimethyl formamide are mixed and heated at 70°–75° C. under nitrogen for 16 hours. The copolymer obtained after distilling off the solvent is water soluble with a considerably higher molecular weight than the polymer prepared from the ethyleneurea alone. A solution of this material when applied at 2% to the headbox of a paper-making machine imparts wet-strength to the resultant paper sheets. Further treatment of such paper increases the level of wet-strength attainable.

The copolymer is also useful as a whiteness-retention agent when used in conjunction with alkylbenzenesulfonate detergents, such as one comprising diisopropylbenzene sulfonate sodium salt. Copolymers prepared in a like manner are useful also as additives to fiber, film, or filament-spinning dopes and as warp-sizes for synthetic fibers such as polyester fibers, especially those of polyethylene terephthalate.

(c) A mixture of 20 parts of methyl methacrylate, 2 parts of the product of part (a), and 0.3 part of benzoyl peroxide are placed into a mold and heated at 100° C. for 2 hours and 120° C. for 30 minutes at 500 pounds per square inch pressure. The resultant piece is hard, clear and insoluble.

(d) A mixture of 96 parts by weight of 4-vinylpyridine and 4 parts of the product of part (a) is suspended in 300 parts of water by stirring in the presence of a polyethylene oxide condensate of nonylphenol containing about 40 units of ethylene oxide. To this suspension is added 2 parts of azoisobutyronitrile and the temperature is raised to 50° C. and then to 65° C. and maintained at this temperature for 4 hours. The product is a suspension of uniform light-colored beads that show good capacity as a weak-base exchange resin and good physical stability during use and regeneration.

(e) By the procedure of part (a) hereof the following condensations are effected.

(1) The bis-carbamyl chloride of N,N'-lauryl-hexamethylenediamine and β-hydroxyethylaminoethyl vinyl ether.

(2) The bis-carbamyl chloride of N,N'-(p-chlorophenyl)-hexamethylenediamine and β-cyanoethylaminoethyl vinyl ether.

(3) The bis-carbamyl chloride of N,N'-benzyldiphenylene-4,4'-diamine and octadecylaminoethyl vinyl ether.

(4) The bis-carbamyl chloride of piperazine and 3-dimethylaminopropylaminoethyl vinyl ether.

(5) The bis-carbamyl chloride of N,N'-(p-nitrophenyl)-hexamethylenediamine and benzylaminoethyl vinyl ether.

(6) The bis-carbamyl chloride of piperazine and 4-aminohexyl vinyl ether.

*Example 4*

A solution of 5 parts of the bis-carbamyl chloride of N,N'-ethylphenylenediamine

in toluene is added to a mixture of 20 parts of 2-aminoisobutyl vinyl ether and 20 parts of toluene at 30°–40° C. An exotherm is noted during the addition and the temperature is maintained at 30°–40° C. The mixture is stirred for a period of six hours; water is added, and the layers are separated. The toluene layer is dried and concentrated to give the product as an impure solid that is further purified by recrystallization.

*Example 5*

(a) A solution of 1 part by weight of trimethylenediamine in benzene is added slowly with cooling (0–5° C.) to 2 parts of 2-isocyanatoisobutyl vinyl ether in benzene. The product precipitates as formed and is isolated as a solid, difficultly soluble in solvents.

(b) In a similar manner the following condensations are effected with 2-isocyanatoisobutyl vinyl ether and the following amines:

(1) Ethylene diamine
(2) Tetramethylene diamine
(3) Decamethylene diamine
(4) Phenylene diamine
(5) 1,2,6-triaminohexane
(6) Piperazine
(7) N,N'-dibutylethylenediamine
(8) N,N'-dibenzylethylenediamine (c) Unsymmetrical products result when monoalkyl alkylene diamines are used. Thus by the procedure of part (a) hereof, the 2-isocyanatoisobutyl vinyl ether is condensed with N-benzylethylenediamine to give the following product

In a similar manner, N-phenylethylenediamine, N-dodecylethylenediamine and N-allylethylenediamine are so condensed, each with 2 moles of the 2-isocyanatoisobutyl vinyl ether, to give an unsymmetrical bis-vinyloxyalkylureidoalkane.

*Example 6*

By the procedure of Example 3 (a) the bis-carbamyl chloride of piperazine is condensed with 2-(N-t-octylamino)ethyl vinyl ether. The product is a solid of low melting point that is useful as a contact insecticide for the control of spider mites. The product may be formulated as an emulsion concentrate, a dust or a wettable powder. The product has the following structure,

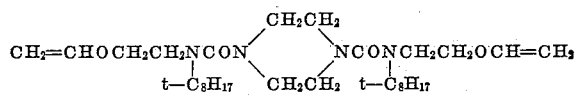

*Example 7*

By the procedure of Example 3(a) the bis-carbamyl chloride of piperazine is condensed with 2-(N-p-chlorophenylamino)ethyl vinyl ether to give a crystalline product readily soluble in hydrocarbon oils and having the following structure,

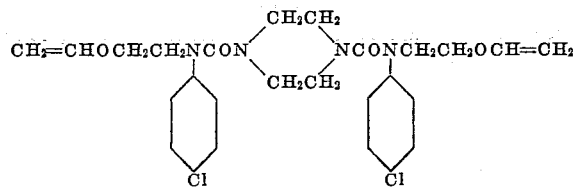

This material is incorporated into mineral solvents and used as a spray to selectively control the growth of grass and other plants.

It is to be understood that changes and variations may be made without departing from the spirit and scope of the invention as defined in the appended claims.

I claim:

1. A composition of matter comprising a compound selected from the group consisting of those having one of the general formulas:

$(CH_2=CHOANRCONH)_nB$
$(CH_2=CHOANR^2CONR')_nB$
$(CH_2=CHOYC(R^3)(R^4)NHCONR')_nB$
$(CH_2=CHOZNHCONR')_nB$ where $n$ is an integer having a value of 2 to 3, A is selected from the group consisting of cyclohexylene and alkylene groups having 2 to 18 carbon atoms, of which a chain of at least two is connected between the adjoining nitrogen and oxygen atoms, R is selected from the group consisting of hydrogen, monovalent hydrocarbon groups having 1 to 18 carbon atoms, and monovalent hydrocarbon groups having 1 to 18 carbon atoms substituted by a member selected from the group consisting of hydroxyl, halogens, nitro, cyano, and tertiary-nitrogen-containing amino groups, B is selected from the group consisting of divalent and trivalent aliphatic and alicyclic hydrocarbon groups having 2 to 18 carbon atoms, divalent and trivalent hydrocarbon residues of a member selected from the group consisting of benzene, naphthalene, diphenyl, diphenylalkanes, and triphenylalkanes, R', when not connected to another R' group, is selected from the group consisting of hydrogen, aliphatic and cycloaliphatic hydrocarbon groups having 1 to 24 carbon atoms, and aliphatic and cycloaliphatic hydrocarbon groups substituted by a member selected from the group consisting of hydroxyl, halogens, nitro, cyano, and tertiary-nitrogen-containing amino groups, R', when connected to another R' group, is a methylene group, $n$ being 2 and B being ethylene in this event, $R^2$ is selected from the group consisting of monovalent hydrocarbon groups having 1 to 18 carbon atoms, and monovalent hydrocarbon groups having 1 to 18 carbon atoms substituted by a member selected from the group consisting of hydroxyl, halogens, nitro, cyano, and tertiary-nitrogen-containing amino groups, Y is an alkylene group of 1 to 2 carbon atoms, $R^3$ is an alkyl group of 1 to 4 carbon atoms, $R^4$ is an alkyl group of 1 to 4 carbon atoms, and Z is selected from the group consisting of cyclohexylene and alkylene groups having 4 to 18 carbon atoms of which a chain of at least 4 is connected between the adjoining nitrogen and oxygen atoms.

2. A composition of matter comprising a polymer of a compound defined in claim 1.

3. A composition of matter comprising a compound of the formula $(CH_2=CHOANHCONH)_2B$ where A is an alkylene group having 2 to 18 carbon atoms, and B is an alkylene group having 2 to 18 carbon atoms.

4. A composition of matter comprising a polymer of a compound of claim 3.

5. A composition of matter comprising a compound of the formula

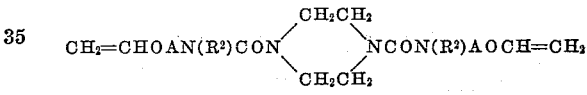

where A is an alkylene group having 2 to 18 carbon atoms, and $R^2$ is a hydrocarbon group having 1 to 18 carbon atoms.

6. A polymer of a compound of claim 5.

7. A process comprising reacting a polyisocyanate of the formula $B(NCO)_n$, where $n$ is an integer having a value of 2 to 3 and B is selected from the group consisting of divalent and trivalent aliphatic and alicyclic hydrocarbon groups having 2 to 18 carbon atoms, divalent and trivalent hydrocarbon residues of a member selected from the group consisting of benzene, naphthalene, diphenyl, diphenylalkanes, and triphenylalkanes, with an aminoalkyl vinyl ether having the structure of the formula $CH_2=CHOANHR$, where A is selected from the group consisting of cyclohexylene and alkylene groups having 2 to 18 carbon atoms, of which a chain of at least two is connected between the adjoining nitrogen and oxygen atoms, and R is selected from the group consisting of hydrogen, monovalent hydrocarbon groups having 1 to 18 carbon atoms, and monovalent hydrocarbon groups having 1 to 18 carbon atoms substituted by a member selected from the group consisting of hydroxyl, halogens, nitro, cyano, and tertiary-nitrogen-containing amino groups, at a temperature of $-15°$ C. to $100°$ C. to produce a compound of the formula $(CH_2=CHOANRCONH)_nB$.

8. A process comprising reacting (1) a bis-carbamyl chloride of the formula $B(NR'COCl)_n$, wherein B is selected from the group consisting of divalent and trivalent aliphatic and alicyclic hydrocarbon groups having 2 to 18 carbon atoms, divalent and trivalent hydrocarbon residues of a member selected from the group consisting of benzene, naphthalene, diphenyl, diphenylalkanes, and triphenylalkanes, R', when not connected to another R' group, is selected from the group consisting of hydrogen, aliphatic and cycloaliphatic hydrocarbon groups having 1 to 24 carbon atoms, and aliphatic and cycloaliphatic hydrocarbon groups substituted by a member selected from the group consisting of hydroxyl, halogens, nitro, cyano, and tertiary-nitrogen-containing amino groups, R', when connected to another R' group and when B is ethylene, is a methylene group, and $n$ is an integer having a value of 2 to 3, with (2) an aminoether selected from the group consisting of those having one of the following formulas:

$$CH_2=CHOANHR^2$$
$$CH_2=CHOYC(CH_3)_2NH_2$$
and
$$CH_2=CHOZNH_2$$

wherein A is selected from the group consisting of cyclohexylene and alkylene groups having 2 to 18 carbon atoms, of which a chain of at least two is connected between the adjoining nitrogen and oxygen atoms, $R^2$ is selected from the group consisting of monovalent hydrocarbon groups having 1 to 18 carbon atoms, and monovalent hydrocarbon groups having 1 to 18 carbon atoms substituted by a member selected from the group consisting of hydroxyl, halogens, nitro, cyano, and tertiary-nitrogen-containing amino groups, Y is an alkylene group of 1 to 2 carbon atoms, and Z is selected from the group consisting of cyclohexylene and alkylene groups having 4 to 18 carbon atoms of which a chain of at least 4 is connected between the adjoining nitrogen and oxygen atoms.

9. A composition comprising

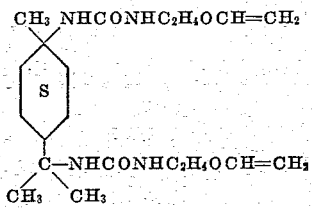

where S indicates that the ring is saturated.

10. A composition comprising 1,6-bis-(2-vinyloxyethylureido)hexane.

11. A composition comprising

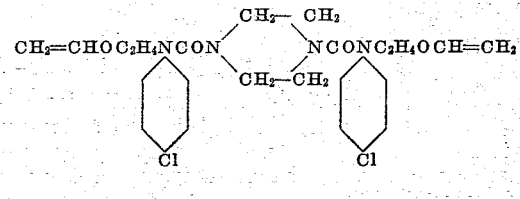

12. A composition comprising

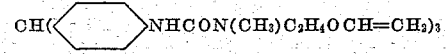

13. A composition comprising a copolymer of

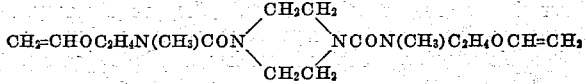

with a predominant proportion of at least one monoethylenically unsaturated comonomer.

14. A composition as defined in claim 13 in which the copolymer is soluble and the comonomer is N-vinyloxyethyl-N,N'-ethyleneurea.

15. A composition as defined in claim 13 in which the copolymer is insoluble and the comonomer is 4-vinylpyridine.

References Cited in the file of this patent
UNITED STATES PATENTS
2,689,844      Melamed _____ Sept. 21, 1954